United States Patent [19]

Karpisek

[11] 4,334,387

[45] Jun. 15, 1982

[54] RETAINER FOR GROWTH SUPPORTING MEDIUM

[76] Inventor: Ladislay S. Karpisek, 86 Woodfield Blvd., Caringbah, N.S.W., Australia

[21] Appl. No.: 167,724

[22] Filed: Jul. 11, 1980

[51] Int. Cl.³ .............................................. A01G 9/02
[52] U.S. Cl. ...................................................... 47/83
[58] Field of Search ................. 47/32, 33, 39, 56, 67, 47/71, 79–81, 82, 83, 85, 86, 87

[56] References Cited

U.S. PATENT DOCUMENTS

| | | | |
|---|---|---|---|
| 2,300,776 | 11/1942 | Collins | 47/81 |
| 2,514,536 | 7/1950 | Burney | 47/83 X |
| 3,389,499 | 6/1968 | Haile | 47/83 X |
| 3,726,042 | 4/1973 | Haile | 47/83 |

FOREIGN PATENT DOCUMENTS

| | | | |
|---|---|---|---|
| 84938 | 3/1965 | France | 47/83 |
| 210800 | 8/1940 | Switzerland | 47/83 |

*Primary Examiner*—James R. Feyrer
*Attorney, Agent, or Firm*—Emory L. Groff, Jr.

[57] ABSTRACT

A retainer for a growth supporting medium such as soil. The retainer being for tiered assembly with like retainers and comprising a multi-sided member open top and bottom and decreasing in cross-section from top to bottom with locating means at the top to divide the open top into a growing zone and a receiving zone to receive and support a like retainer located thereabove.

3 Claims, 5 Drawing Figures

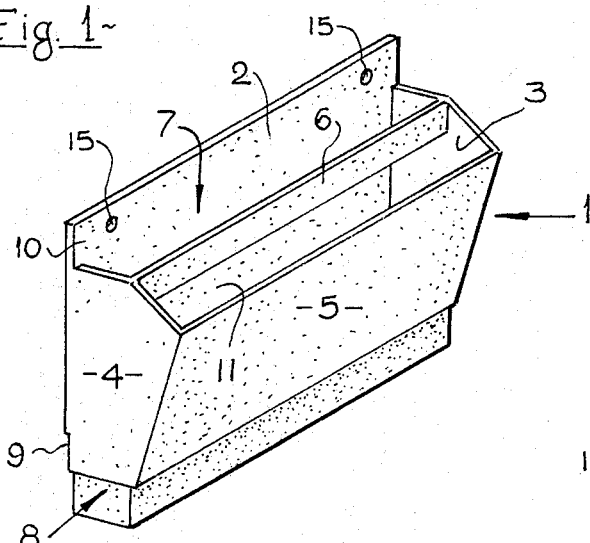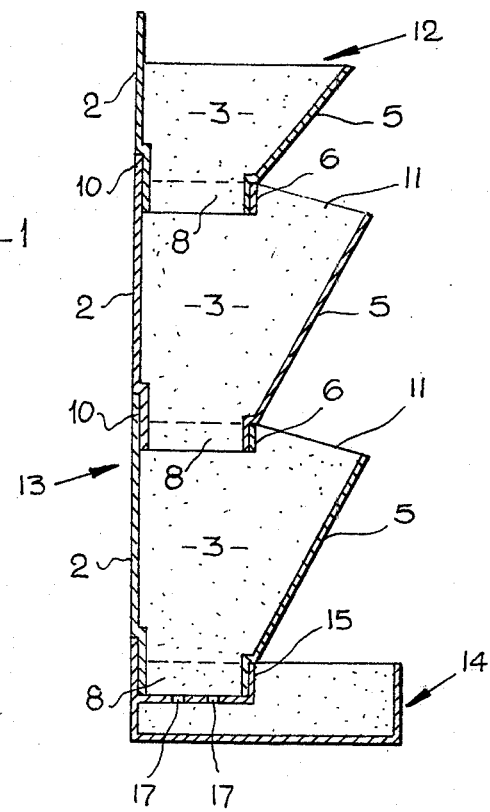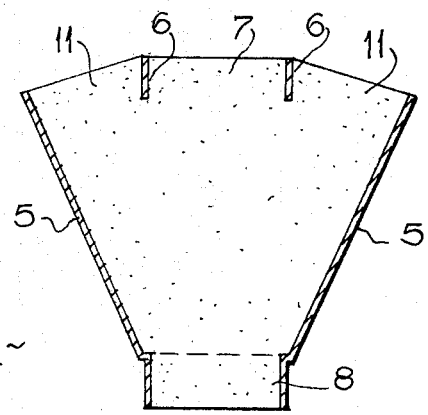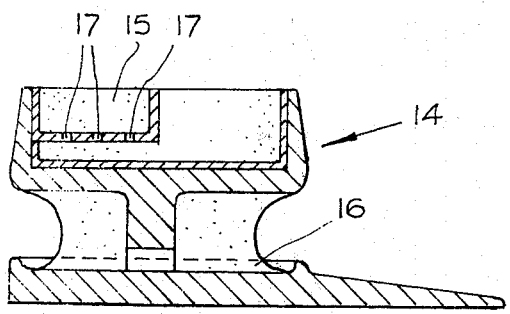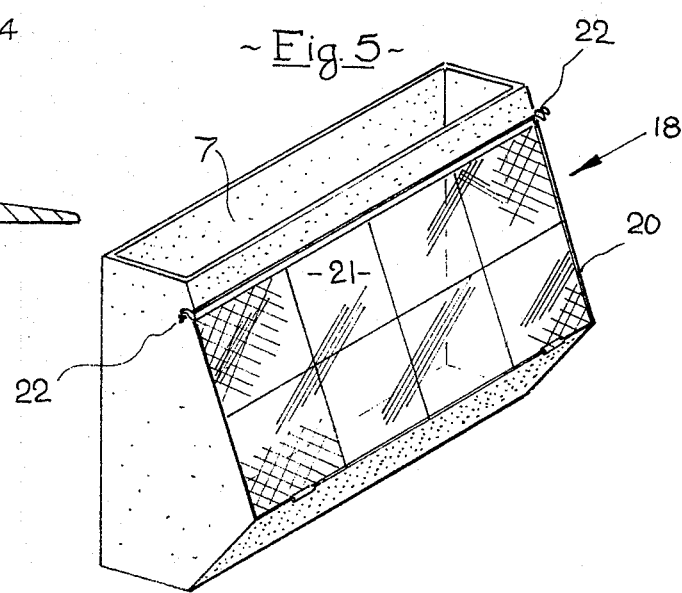

RETAINER FOR GROWTH SUPPORTING MEDIUM

This invention relates to retainers for a growth supporting medium such as soil and tiered assemblies thereof to form gardens developed on a multi-level concept, such gardens are hereinafter called vertical gardens. Such a garden provides many growing areas one above the other, each area being substantially equal to the site area over which the vertical garden is located. As a consequence site areas are more efficiently used each providing a location for a plurality of growing areas (beds) where in normal cultivation a single site area provided a single bed.

As will be readily seen the system will avoid the wastage of site areas as there is no need for paths between beds to allow flowers and/or vegetables to be tended. Unpleasant aspects of gardening are avoided, e.g. bending over the garden beds to remove weeds or otherwise care for the growing plants. The garden beds can be located at levels enabling all such work to be done whilst standing erect.

Vertical gardens as proposed can be mounted against a wall, or can be used as a vertical flower garden to act as a privacy barrier, or a single or multi-sided vertical garden can be used as a free standing architectural feature wall. The possible uses are many and include gardens to raise delicate crops, expensive or exotic crops or just simply flower displays.

It is the object of this invention to provide the means whereby the benefits to be obtained by vertical gardening can be readily achieved.

The invention broadly comprises a retainer for a growth supporting medium such as soil, said retainer being for tiered assembly with like retainers, each said retainer being elongated and having two sides, two ends joining said sides, an open top and an open bottom, the width of the open top between the said sides being greater than the overall width of the retainer bottom, the length of the open top between the said ends approximating but being greater than the overall length of the retainer bottom, locating means projecting into the said open top of said retainer to laterally divide said open top into receiving and growing zones and to also laterally stabilise the lower end of a superimposed retainer when it is inserted into the receiving zone of an underlying retainer in a tiering operation.

The invention will be readily understood from the following description of several embodiments which are related to the drawings in which:

FIG. 1 is a perspective view of one embodiment of the invention which is a multi-sided box like retainer for soil or like medium in which plants can be grown, FIG. 2 is a sectional end view of several retainers of the type shown in FIG. 1 assembled to form a vertical garden, FIG. 3 is sectional end view of another form of retainer, FIG. 4 is a sectional end view of a bottom or foot member for an assembly as illustrated in FIG. 2, and FIG. 5 is a perspective view of another embodiment of the retainer of the invention.

The several forms of the invention will now be described. Considering first the concept involved, this can be seen from FIGS. 1 and 2 where there is illustrated a multi-sided box like retainer 1 which comprises a back 2, ends 3 and 4, a front 5 (inclined to the vertical) and a divider 6 connecting the ends 3 and 4.

The sides 2, 3, 4 and 5 define a compartment, which is open at the top and bottom, to house a growing medium hereinafter called soil. The internal cross-sectional area of the open top of the box is greater than that of the bottom. The divider 6 provides a pocket 7 at the top to receive a parallel sided bottom part 8 of another box. Boxes are superimposed to form a garden as shown FIG. 2. The box back 2 is recessed as at 9 to accept the upstanding flange 10 of the back 2 of another box. The remainder of the top area of the box provides a cultivation zone 11. If desired the divider 6 may be omitted and lugs added to laterally retain the bottom of an upper box.

The FIG. 2 arrangement illustrates several boxes (as described above) superimposed to provide a vertical garden and a top box 12, with no divider 6. The assembled garden 13 sits on a bottom member 14, which in this case also serves as a collector for excess water after it passes through the garden from a trough supported above and discharging at a controlled rate into top box 12. The concept is readily understood from the foregoing. Holes 15 in the backs 2 are provided to allow the tiered boxes to be connected by connecting means to a post or posts or a wall or the like.

An alternate form of box is shown in FIG. 3. This box has a socket 7 between two bars 6 and two cultivation zones 11.

The bottom 14 may be developed into a foot assembly (see FIG. 4) having socket 15 to receive part 8 of the lowermost box and a bait tray 16 for snail and slug bait. The socket 15 includes drain holes 17.

In a development of the foregoing the configuration is varied as shown in FIG. 5 to provide an enlarged cultivation zone 18. To prevent soil loss a hinged grid door 20 is provided together with an underlay of, for example, plastics material indicated 21. A catch 22 is provided to retain the door 20 closed.

Planting involves puncturing the plastic 21 to insert a seedling or seed in the soil therebeneath.

It will be clear that such constructions can be readily made by plastics moulding techniques as well as by conventional fabrication techniques.

I claim:

1. A retainer growth supporting medium such as soil, said retainer being for tiered assembly with like retainers, each said retainer being elongated and having two sides, two ends joining said sides, an open top and open bottom, the width of the open top between the said sides being greater than the overall width of the retainer bottom, the length of the open top between the said ends approximating but being greater than the overall length of the retainer bottom, one of said sides inclined inwardly downwardly relative to the other side, said ends parallel to each other, said ends and said inclined side adjacent the retainer bottom being instepped to provide first shoulders spaced at a uniform distance from said retainer bottom and the other side being instepped adjacent the retainer bottom to form a second shoulder spaced further from the retainer bottom than said first shoulders, the top edge of said other side standing above the top edges of said ends by an amount less than the difference between the distance of said first shoulders from said retainer bottom and the distance of the second shoulder from the retainer bottom, locating means projecting into the said open top of said retainer to laterally divide said open top into receiving and growing zones and to also laterally stabilize the lower end of a superimposed retainer when it is inserted into the receiving zone of an underlying retainer in a tiering operation.

2. A retainer as claimed in claim 1 wherein the locating means is a bar extending the length of the open top to divide it into a receiving and a growing zone.

3. A retainer as claimed in claim 1 wherein the locating means comprises two bars extending the length of the open top to divide it into a receiving zone and two growing zones located one to each side of the receiving zone.

* * * * *